(12) United States Patent
Bingeman et al.

(10) Patent No.: US 9,920,276 B2
(45) Date of Patent: Mar. 20, 2018

(54) HIGH PERFORMANCE, WATER-DILUTABLE LUBRICITY ADDITIVE FOR MULTI-METAL METALWORKING APPLICATIONS

(71) Applicant: Ethox Chemicals, LLC, Greenville, SC (US)

(72) Inventors: Ron Bingeman, Brookhaven, PA (US); Charles Francis Palmer, Greer, SC (US); James T. Tanner, Greer, SC (US); Calvin M. Wicker, Jr., Spartanburg, SC (US)

(73) Assignee: Ethox Chemicals, LLC, Greensville, SC (US)

( * ) Notice: Subject to any disclaimer, the term of this patent is extended or adjusted under 35 U.S.C. 154(b) by 0 days.

(21) Appl. No.: 14/617,917

(22) Filed: Feb. 9, 2015

(65) Prior Publication Data

US 2015/0225666 A1    Aug. 13, 2015

Related U.S. Application Data

(60) Provisional application No. 61/937,490, filed on Feb. 8, 2014.

(51) Int. Cl.
| | | |
|---|---|---|
| *C10M 145/00* | (2006.01) | |
| *C11C 3/00* | (2006.01) | |
| *C08G 65/332* | (2006.01) | |
| *C10M 159/12* | (2006.01) | |
| *C10M 145/16* | (2006.01) | |
| *C08L 71/02* | (2006.01) | |

(52) U.S. Cl.
CPC ......... *C10M 145/16* (2013.01); *C08G 65/332* (2013.01); *C08G 65/3322* (2013.01); *C08L 71/02* (2013.01); *C10M 159/12* (2013.01); *C11C 3/00* (2013.01); *C08G 2650/58* (2013.01)

(58) Field of Classification Search
CPC . C10M 145/16; C10M 159/12; C08G 65/332; C08G 65/3322; C08G 2650/58; C08L 71/02
USPC ....................................................... 508/512
See application file for complete search history.

(56) References Cited

U.S. PATENT DOCUMENTS

| | | | |
|---|---|---|---|
| 3,945,930 A | 3/1976 | Sugiyama et al. | |
| 4,203,677 A | 5/1980 | Baker | |
| 4,203,877 A * | 5/1980 | Baker | B01F 17/0028 524/500 |
| 5,420,315 A * | 5/1995 | Uhrig | B01F 17/0021 554/213 |
| 2010/0048706 A1* | 2/2010 | Subramanyam | A61K 8/375 514/560 |
| 2011/0218264 A1* | 9/2011 | Casati | C08G 18/36 521/157 |

FOREIGN PATENT DOCUMENTS

| | | |
|---|---|---|
| JP | S57-108195 A | 7/1982 |
| JP | H04-320499 A | 11/1992 |
| JP | H10-316988 A | 12/1998 |
| JP | 2007-517965 | 7/2007 |

* cited by examiner

*Primary Examiner* — James Goloboy
(74) *Attorney, Agent, or Firm* — Joseph T. Guy; Patent Filing Specialist, Inc.

(57) ABSTRACT

The invention provides lubricating composition comprising: (1) a reaction product selected from the group consisting of: (a) a polyalkanoic or polyalkenoic acid derived from hydroxyfatty acids and a block copolymer selected from the group consisting of polyoxyethylene-polyoxypropylene and a reverse block copolymer of polyoxypropylene-polyoxyethylene-polyoxypropylene; (b) the reaction product of (a) with a maleic acid or anhydride; and (c) the reaction product of (a) with maleated soybean oil; and (2) at least one base oil selected from the group consisting of alkyl benzene, normal paraffin, isoparaffin, mineral oil and α-olefin.

5 Claims, No Drawings

HIGH PERFORMANCE, WATER-DILUTABLE LUBRICITY ADDITIVE FOR MULTI-METAL METALWORKING APPLICATIONS

This application claims the priority benefit under 35 U.S.C. section 119 of U.S. Provisional Patent Application Nos. 61/937,490 entitled "High Performance, Water-Dilutable Lubricity Additive For Multi-Metal Metalworking Applications" filed on Feb. 8, 2014, which is in its entirety herein incorporated by reference.

FIELD OF INVENTION

This invention relates generally to metalworking fluids. The invention also relates to lubricant compositions that are useful as lubricants in metal working processes. The present invention further relates to lubricating oil compositions serving as a sliding surface oil and a metal working oil, and a method of lubricating working machinery using the lubricating oil composition.

This invention additionally relates to metal working lubricants in neat or emulsified form. The present invention also relates to improved lubricants useful for a variety of metalworking applications.

The invention also relates to a lubricant composition, which can widely be applied to metal processing such as cutting, grinding and plastic working.

BACKGROUND OF THE INVENTION

Metal working lubrication has been accomplished, as is well known, by the use of mineral and/or fatty oils. In the early technology, these fats and oils were used alone, but with the advent of improved technology, it was useful to prepare aqueous emulsions of mineral and/or fatty oils in order to reduce costs, improve cooling capacity, and give generally better performance. Until recent years almost all water containing lubricants were emulsions of fatty and/or mineral oils which might or might not contain various additives for particular applications. However, emulsion type products have several inherent problems, as, for example, emulsion stability, and for this reason and others they often find their utility limited. In recent years, water containing lubricants of the solution type have become available and in areas where cooling ability is the primary consideration the water soluble lubricant has shown great merit. However, where conditions require both a high degree of cooling plus a high degree of hydrodynamic or oil film lubricity characteristics, the water soluble lubricants have not been suitable because they have been unable to deposit a film containing sufficient lubricity for proper function under hydrodynamic conditions.

Metalworking fluids are employed in metalworking operations such as cutting, forming, stamping and rolling to provide cooling and lubrication to both the workpiece and the metalworking apparatus. The metalworking fluids also function to flush away oil and debris from the worksite, and they provide corrosion protection to both the workpiece and the metalworking apparatus. Initially, metalworking fluids comprised oil-based materials or emulsions of water and oil. However, the industry has increasingly sought to replace oil-based products with water-based materials. Therefore, the industry is turning toward the use of water-based metalworking fluids.

In addition to providing a cooling function, water-based metalworking fluids must provide good lubricity to the workpiece and metalworking apparatus, and be capable of sequestering and removing debris and contaminants, including oils, from the worksite. In addition, water-based metalworking fluids should provide good corrosion protection to both equipment and workpieces. Toward that end, the industry has developed various water-based metalworking fluid compositions; however, a number of problems have arisen in connection with the use of such compositions.

Metal working processes of many kinds are used in the fabrication of metal goods. Typically metal is removed from the work-piece during metal working. Examples of metal working processes include machining, cutting, drilling, grinding, turning, milling, tapping and broaching. Metal working differs from metal forming. In metal forming typically no metal is removed. Examples of metal forming processes include rolling, forging, molding, stamping, casting, ironing, drawing, and extruding. In metal forming operations, the metal is typically preheated to at least about 800° C. so that the metal can be more easily formed into the desired shape. In metal working operations, the metal is typically not preheated; the only heat incident to the operation is that caused by the metal working operation itself.

In all metal working operations it is necessary to lubricate the interface between the workpiece and the tool to decrease the force required to work the metal; to cool the work-piece; to remove chips from the cutting zone; to impart a good surface finish; and to extend the life of the tool. The formulation of lubricant compositions is complex, because a wide variety of compounds may be used, as, for example, antifriction agents, anticorrosion agents, surfactants, and biocides.

Triaryl phosphate esters have been proposed in the past for use in metal working lubricant compositions. Berens, U.S. Pat. No. 4,362,634, discloses metal working lubricant compositions that comprise a polyol ester, such as a pentaerythritol/fatty ester, as the major ingredient together with a triaryl phosphate ester and a carboxylic ester non-ionic surfactant of the anhydrosorbitol or glycerol ester type, such as sorbitan monotallate. The phosphate ester comprises 1 to 10 weight % of the concentrated lubricant composition. About 2 to 30 weight % of concentrated composition can be dispersed with water to form a diluted lubricant composition as an emulsion that was reported to be phase stable for at least one hour under quiescent conditions.

Historically, metalworking lubricant formulations are made by combining several separate ingredients that are known, individually, to have lubricating functions. For example, various oils, block copolymers, liquid crystal formers and surface active agents would be coupled together and provided to the final users as blended products.

Metal working lubricant compositions are preferably produced as concentrates, which are diluted prior to use. Concentrated lubricant compositions are prepared by the manufacturer and shipped in drums to the user, who may store the drums of concentrated lubricant composition for several weeks to months prior to use. Because the lubricant properties of the metal working lubricant composition are typically lost if the lubricant composition deemulsifies, the concentrated lubricant composition should have a shelf life (stability, i.e., time before deemulsification occurs) at room temperature (about 25° C.) of at least one month, and preferably at least six months. The high temperature (about 75° C.) stability and the low temperature stability (about −15° C.) should each be at least 5 days. Following dilution of the concentrated lubricant composition, the resulting diluted lubricant composition should have a shelf life at room temperature of at least one month, preferably at least six months, a high temperature stability of at least one day and a low temperature stability of at least one day.

It is also known that metalworking lubricants based on natural fats and oils (triglycerides) have been used in the art and utilized throughout the industry for a variety of processes including rolling, stamping, drawing, pickling, cutting and extruding. Aqueous formulations of natural fats and oils are widely used as the rolling oil in the cold rolling of steel to provide lubrication and cool the rolls.

In addition to providing effective lubrication and effective cooling of the workpiece/working elements, there are other criteria which must be met by metalworking lubricants. Rolling oils, for example, must be capable of providing a continuous coating on the surface of the metal. Furthermore, this coating or film must have a minimum thickness and must be substantive enough to the metal so that it will be maintained at the high pressures which occur in the roll bite. Above and beyond these lubrication considerations it is particularly advantageous if the rolling oil provides some measure of corrosion protection to the rolled strip and burns off cleanly during the annealing operation. Most cold rolled strip is annealed by heating at about 1300° F. in a reducing atmosphere to relieve internal stresses built up during the prior working operations and to give the finished steel the desired physical properties. Residual rolling oil must volatilize cleanly and should not leave any carbonaceous deposits or surface discoloration.

In view of variations in the metals being worked and the different operating conditions and application methods employed, numerous metalworking oils based on natural fats and oils have been developed in an attempt to obtain the optimum balance of properties. Most of these variations have involved the use of different fats and oils or replacement of a portion of the fat or oil with a petroleum product, e.g. mineral oil, or a synthetic lubricant, e.g. a synthetic hydrocarbon or ester. Emulsifier systems have also been widely varied and additives have been employed to enhance the characteristics of these oils.

To a lesser extent the natural fats and oils have been chemically modified to alter their properties. U.S. Pat. No. 3,202,607 discloses the ethoxylation of castor oil and their use in aqueous dispersions for metalworking. In British Pat. No. 847,517 two moles triglyceride and one mole polyethylene glycol are interesterified to produce useful products which are mixtures of mono-, di-, and triglycerides and mono- and diesters of polyethylene glycol. Products useful for resolving water-in-oil emulsions which are the reaction product of castor oil with a polyalkylene glycol and an organic dicarboxy acid, such as diglycolic acid or phthalic anhydride, are disclosed in U.S. Pat. No. 2,925,429. U.S. Pat. No. 2,971,923 discloses similar products for breaking petroleum emulsions and desalting mineral oils.

U.S. Pat. No. 3,720,695 discloses ester lubricants which have a wide variety of uses obtained by first transesterifying castor oil with polyoxyethylene glycol of molecular weight greater than 1000, and then, in a separate and distinct step, esterifying the available hydroxyl groups with a mono- or dicarboxylic acid.

Mixed ester products having significantly improved water solubility are disclosed in U.S. Pat. Nos. 3,634,245 and 3,928,401. The mixed esters are obtained by reacting a triglyceride with a short-chain mono- or dicarboxylic acid and a low molecular weight polyoxyethylene glycol in a single-step operation. Mixed ester products which are readily emulsifiable with water and useful as metalworking fluids, obtained by treating a triglyceride under transesterification conditions with a polyoxyalkylene glycol and a high molecular weight dicarboxylic acid, such as a polymeric fatty acid, are disclosed in U.S. Pat. No. 4,067,817. Blends of the mixed ester with hydrocarbon oils, e.g. mineral oil, are described in U.S. Pat. No. 4,108,785.

Whereas numerous metalworking lubricants based on both unmodified and modified triglycerides have been developed, there is a continuing need for new products. This is particularly so where the new products present economic advantages and/or performance advantages. Performance advantages can include greater latitude in the ability to effectively formulate the lubricant. It can also include improvement in one or more of the properties of the lubricant. It is particularly effective if these improvements are achieved without adversely affecting the other essential properties of the lubricant.

There is also a need in the art for both concentrated and diluted metal working lubricant compositions/emulsions that are stable for longer periods so that they can be produced and stored for longer periods of time prior use.

OBJECTS OF THE INVENTION

It is an object of the present invention to provide a lubricant composition, which shows excellent processing characteristics when it is used as a lubricating agent for metal-processing including rolling, cutting and grinding, which is stable and can maintain its transparency even after the dilution with water, which is excellent in the resistance to decomposition and which does not adversely affect the environment.

SUMMARY OF THE INVENTION

The present invention provides a compound of the formula I

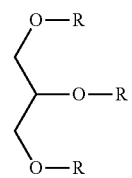

where R is

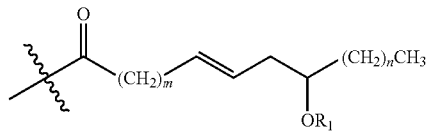

where m=3-12, n=3-8 and $R_1$ is

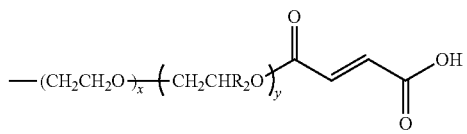

where x=1-50, y=1-100 and $R_2$ is $C_1$-$C_{16}$ primary alkyl or secondary alkyl.

The invention also provides a compound of the formula II

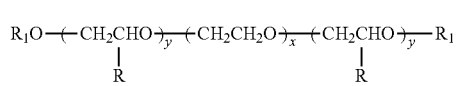

where R is $C_1$-$C_{16}$ primary alkyl or secondary alkyl; $R_1$ is selected from the group consisting of a maleated soybean oil moiety, polyhydroxystearyl, polyricinoleyl and mixtures thereof; x=1-100 and y=1-200.

The invention is also directed a compound selected from the group consisting of: (a) the reaction product of a polyalkanoic or polyalkenoic acid derived from hydroxyfatty acids and a block copolymer of polyoxyethylene-polyoxypropylene; (b) the reaction product of (a) with a maleic acid or anhydride; and (c) the reaction product of (a) with maleated soybean oil.

The invention further provides lubricant compositions comprising: (1) a reaction product selected from the group consisting of: (a) a polyalkanoic or polyalkenoic acid derived from hydroxyfatty acids and a block copolymer selected from the group consisting of polyoxyethylene-polyoxypropylene and a reverse block copolymer of polyoxypropylene-polyoxyethylene-polyoxypropylene; (b) the reaction product of (a) with a maleic acid or anhydride; and (c) the reaction product of (a) with maleated soybean oil; and (2) at least one base oil selected from the group consisting of alkyl benzene, normal paraffin, isoparaffin, mineral oil and α-olefin.

The thrust of this invention is to create new lubricating agents by reacting various independent lubricants into one molecule. The invention provides compounds selected from the group consisting of: (a) the reaction product of a polyalkanoic or polyalkenoic acid derived from hydroxyfatty acids and a block copolymer of polyoxyethylene-polyoxypropylene; (b) the reaction product of (a) with a maleic acid or anhydride; and (c) the reaction product of (a) with maleated soybean oil.

DETAILED DESCRIPTION OF THE INVENTION

In a first aspect of the invention, there is provided improved metalworking lubricants obtained by reacting: (a) a polyalkanoic or polyalkenoic acid derived from hydroxyfatty acids and a block copolymer of polyoxyethylene-polyoxypropylene or polyoxypropylene-polyoxyethylene; (b) the reaction product of (a) with a maleic acid or anhydride; and (c) the reaction product of (a) with maleated soybean oil. While the exact composition of the product resulting from the above reactions is not known, it is a complex mixture of a variety of ester products resulting from interchange and condensation reactions.

In a second aspect of the invention, there is provided a compound of formula I

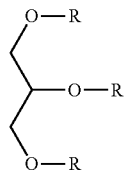

where R is

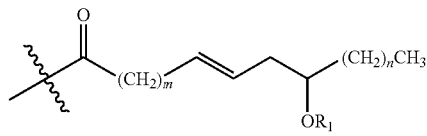

where m=3-12, n=3-8 and $R_1$ is

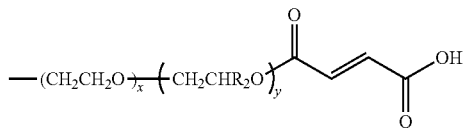

where x=1-50, y=1-100 and $R_2$ is $C_1$-$C_{16}$ primary alkyl or secondary alkyl. A preferred value for x is 5-50 and for y is 20-100.

The R residue of formula I is derived from hydroxy fatty acids having at least 12 carbon atoms such as ricinoleic, hydroxystearic, polyricinoleic acid and polyhydroxystearic acid. The compounds of formula I are prepared by first alkoxylating the hydroxyfatty acid with an alkylene oxide such as ethylene oxide, propylene oxide or $C_4$-$C_{16}$ alkylene oxides and then reacting with the resulting alkoxylate with maleic anhydride.

In conducting the reactions, the castor oil is first reacted with the required number of moles of ethylene oxide and the product removed. The required amount of material is put back into the reactor and the propylene oxide is reacted in a second step. The product is then neutralized and removed. An appropriate amount of the castor oil with the required levels of ethylene oxide and propylene oxide is then reacted with maleic anhydride in a 1:1 mole ratio by heating at 150° C., max., until all the maleic anhydride is consumed.

In preparing the alkoxylates of castor oil, one generally will first ethoxylate the castor oil. Once the desired level of ethoxylation has been achieved, the resulting product, e.g., the ethoxylated castor oil is then propoxylated and/or butoxylated with an effective amount of propylene oxide or butylene oxide to insure that at least one mole of propylene oxide or butylene oxide per mole of castor oil is reacted therewith. However, one could readily envision a single alkoxylation process in which two or more alkyleneoxy monomers are mixed prior to alkoxylation.

In carrying out the desired ethoxylation it is important to insure that the reactor is in a clean and dry condition. Thereafter, the castor oil is charged into the reactor along with a minor amount of sodium hydroxide flake. Agitation is then commenced within the reactor and vacuum stripping in the magnitude of 25 to 28 inches is likewise commenced. Thereafter, the reactor and contents therein is heated to a temperature of from about 100° C. to about 150° C. while maintaining a vacuum on the reactor for a period of time after the reactants within the reactor have reached the desired temperature. Thereafter, the vacuum on the reactor is broken with nitrogen and the reactor is purged, preferably about two times, followed by venting. However, the pressure on the reactor should be maintained up to about 150 psi. Once the reactor has been purged with nitrogen, vented, and the pressure established, the temperature of the reactants is then increased to about 145-150° C. at which time the desired amount of ethylene oxide is introduced into the reactor. Once the ethylene oxide has been completely added, the reactor is maintained at such reaction conditions for a period of time to allow substantially complete reaction of the ethylene oxide with the castor oil. Thereafter, the reactor is vacuum stripped to remove any unreactive ethylene oxide and then repressured with an inert gas, such as with nitrogen, for the subsequent propoxylation or butoxylation of the ethoxylated castor oil.

To propoxylate or butoxylate the resulting ethoxylated castor oil the following procedure can be employed. The temperature of the reactor is preferably reduced to a temperature of from about 110° to 140° C. and the propylene oxide or butylene oxide is added to the reactor in a predetermined amount. The pressure on the reactor should gradually increase upon the addition of the propylene oxide or butylene oxide. Generally a pressure of less than about 60 psi is maintained in the reactor during the propoxylation or butoxylation step. The reaction of propylene oxide or butylene oxide will generally be somewhat more sluggish than that of the ethylene oxide particularly where the concentration of propylene oxide or butylene oxide is low. The reaction is held at reaction temperature for about one hour after all the propylene oxide or butylene oxide has been added to the reactor. Thereafter, the product is vacuum stripped to remove any unreacted constituents from the reactor. It is advisable at this time to submit a sample of the resulting product for analysis to see if the desired amount of propoxylation or butoxylation has occurred. If additional propoxylation or butoxylation is determined to be necessary, such can be readily obtained by the addition of a propylene oxide or butylene oxide charge to the reactor and the maintaining of the reactor in the before-mentioned reaction conditions.

Once the proper degree of ethoxylation and propoxylation or butoxylation has been achieved, the product is again stripped well to remove any residual propylene oxide or butylene oxide. Thereafter, the resulting ethoxylated-propoxylated or butyoxylated castor oil composition is then cooled under nitrogen to a temperature of less than about 100° C. If required, the product can be bleached to the color specification using any suitable bleaching agent, such as 30% hydrogen peroxide. The product can then be recovered from the reactor and be pH adjusted if desired.

The castor alkoxylate and maleic anhydride were then charged at a 1:1 molar ratio. The reaction mixture is heated at 150° C. with agitation under a nitrogen sparge until GC analysis of the reaction mixture indicates no free maleic anhydride remains.

In a third aspect of the invention, there is provided a compound of the formula II

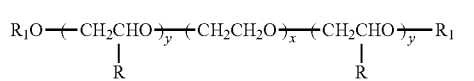

where R is $C_1$-$C_{16}$ primary alkyl or secondary alkyl; $R_1$ is selected from the group consisting of a maleated soybean oil moiety, polyhydroxystearyl, polyricinoleyl and mixtures thereof; x=1-100 and y=1-200. A preferred range for x is 10-100 and for y is 10-200.

The above compound of formula II is prepared by reacting first a reverse block HO—$(PO)_y$-$(EO)_x$—$(PO)_y$—OH glycol with soy/maleic adduct to form an ester bond. No water is evolved in this step. The second step is the esterification of the polyricinoleic acid with the other hydroxyl on the reverse block polymer. This evolves water. This is run at 1 mole of reversed block to 1 mole polyricinoleic and 1 mole soy/maleic anhydride adduct. Since the soy/maleic anhydride/reverse block reaction is much faster, a mixture of products will result, the soy/maleic/reverse block diester along with some of the polyricinoleic/reverse block diester. Since the soy/maleic adduct will react with most of the reverse block, there is probably free polyricinoleic acid as well.

Since mole of the reverse block HO—$(PO)_y$-$(EO)_x$—$(PO)_y$—OH glycol is combined with one mole of maleated soybean oil (1 mole maleic anhydride per 1 soy triglyceride) and one of polyhydroxystearic acid (average number of repeat hydroxystearic acid units≈3), the end groups $R_1$ on formula II is a statistical mixture (i.e., some polyethers will have PHSAs, some will have two soy maleates, and some will have one PHSA and one soy maleate) of PHSA and maleated soy.

Due to their ready compatibility with water and other desirable characteristics, the reaction products of this invention find particular utility in aqueous metalworking fluids formulated for ferrous or other metals where in addition to lubrication a high degree of cooling is desired. Aqueous lubricant systems of this type, which include dispersions and emulsions, are used in rolling, forging, casting, cutting, grinding, stamping, extruding and drawing operations. Rolling oil formulations are probably the single most important application for aqueous metalworking lubricants due to the large volume of product used in rolling operations.

The compounds of formula I and II can be formulated together with a variety of other oils such as alkyl benzene, normal paraffin, isoparaffin, mineral oil and α-olefin.

A variety of additives can be included in the metalworking fluid to improve the quality of the fluid and/or enhance performance properties. These include but are not limited to enhance performance additives, corrosion inhibitors, anti-wear agents, metal deactivators, defoamers, anti-rust agents, deodorants, dyes, fungicides, bacteriocides, antioxidants, emulsion or dispersion stabilizers and the like. These additives and their function in formulated lubricants are well known in the industry and widely reported in the literature.

These agents can then be used as lubricating couplers in conjunction with oils and other lubricants or as stand-alone metal-working compounds. It is to be understood that other additives must be included, as well, such as corrosion inhibitors, pH adjusters, etc. In example (1) the lowest friction in an aluminum microtap test is from a blend of a 100 vis. oil and a new additive made from an ethylene oxide-propylene oxide chain which was reacted with castor oil that been made somewhat water dispersible by the attachment of maleic acid. In example (2), again, a microtap test on aluminum, a polymer made from a reverse-block copolymer, Ethox 17-R-2 reacted with Polyricinoleic acid to an AV=15.6, in conjunction with a 100 vis oil was the top performer among a field that included the competitors Hocut 795H, LT 5200, HOSS 5200 and MOSS 5100. In example (3), also a microtap test, the best of the experimental products (especially on aluminum) is a molecule made from a 1:1:1 mole reaction product of the block copolymer Ethox 17-R-2/polyricinoleic acid and Soy maleate, in conjunction with the 100 vis oil. This combination also outperformed the commercial competitors Castrol AU-68 and Syn 3495.

The compounds of formula I and II are excellent lubricants for both ferrous and non-ferrous metals and can be used for a wide variety of lubricating applications. They can comprise the sole lubricant of a lubricating formulation or they may be used in combination with one or more other lubricant products-natural, synthetic or derived from petrochemical sources. If they are one of the components in a lubricant composition, the compound of formula I or II or mixtures thereof may be the major or a minor component of the blend. The blends can contain from 0.1% to 99.9% of the compound of formula I or II or mixtures thereof and from 99.9% to 0.1% conventional fatty oil or hydrocarbon oil. More usually the blends will contain from 5% to 95% of compounds of formula I or II or mixtures thereof and 95% to 5% conventional fatty oil or hydrocarbon oil. The lubricants of this invention or blends thereof can be used neat or with a suitable carrier or diluent in which they are soluble, emulsifiable or dispersible. The compounds of formula I or II or mixtures thereof are commonly blended with a suitable solvent, carrier, or base oil which in addition to serving as a diluent also imparts desirable properties to the lubricant formulation. Typically, hydrocarbon oils which are synthetically produced or which are obtained from the distillation of petrochemical products are used for this purpose. Hydrocarbon oils, both napthenic and paraffinic, having 100° F. viscosities up to about 1000 SUS and, more preferably, from 40 SUS to 500 SUS. Representative hydrocarbon oils include mineral oil, mineral seal oil, kerosene, gas oil, polyalphaolefins, and the like. The products may also be formulated with synthetic esters and additives such as stabilizers, fungicides, bacteriocides corrosion inhibitors, wetting agents and the like to enhance their performance in the widely diverse application areas where they find utility.

Due to their ready compatibility with water and other desirable characteristics, the compounds of formula I or II and mixtures thereof of this invention find particular utility in aqueous metalworking fluids formulated for ferrous metals where in addition to lubrication a high degree of cooling is desired. Aqueous lubricant systems of this type, which include dispersions and emulsions, are used in rolling, forging, casting, cutting, grinding, stamping, extruding and drawing operations. Rolling oil formulations are probably the single most important application for aqueous metalworking lubricants due to the large volume of product used in rolling operations.

Metalworking lubricant compositions, particularly rolling oil formulations, useful in aqueous systems are obtained by the addition of a suitable emulsifying or dispersing agent and one or more additives to impart the desired characteristics to the fluid. These formulated compositions may be based on the compounds of the invention by itself or the above-described blends with a hydrocarbon oil and/or conventional fat or oil. In general, the emulsifier will be present from about 0.1% to 15% and, more preferably, from 0.3% to 12% and will be selected from any of the conventional anionic, cationic, nonionic or amphoteric surfactants known for this purpose. As employed herein the terms emulsifier, dispersant and surfactant are used interchangeably. Additives will typically constitute from 0.1% to 20% and, more preferably, from 0.1% to 15%. All of the percentages recited above are based on the total weight of metalworking composition excluding water. The formulated metalworking lubricant composition will usually constitute from 0.5% to 25% of the aqueous dispersion or emulsion and, more preferably, 1% to 20% of the aqueous dispersion or emulsion.

The emulsifying/dispersing agents can be selected from a wide variety of known compounds. A mixture of two or more emulsifiers, which can be the same or different types, can also be advantageously used. Choice of the particular emulsifying/dispersing agent will primarily depend on the amount of water used; the compounds of formula I or II being used; whether other triglyceride and/or hydrocarbon lubricants are present; the application involved; and the characteristics required of the resulting aqueous emulsion or dispersion.

Amphoteric compounds which can be used include alkyl-β-iminodipropionate; alkyl-β-amino-propionate; fatty imidazolines and betaines, more specifically 1-coco-5-hydroxyethyl-5-carboxymethyl imidazoline; dodecyl-β-alanine; N-dodecyl-N,N-dimethyl amino acetic acid; 2-trimethyl amino lauric acid inner salts; and the like.

Representative nonionic surfactants which can be used to obtain acceptable emulsions or dispersions include ethylene oxide adducts of alcohols, polyols, phenols, carboxylic acids and carboxylic acid esters such as ethylene oxide adducts of oleyl alcohol, nonyl phenol, glycerol, sorbitol, mannitol, pentaerythritol, sorbitan monolaurate, glycerol monooleate, pentaerythritol monostearate, oleic acid, stearic acid, and the like.

Useful cationic compounds include cetyl pyridinium bromide, hexadecyl morpholinium chloride, dilauryl triethylene tetramine diacetate, didodecylamine lactate, 1-amino-2-heptadecenyl imidazoline acetate, cetylamine acetate, oleylamine acetate, ethoxylated tallow, coco, stearyl, oleyl or soya amine, and the like. Useful anionic compounds include alkali metal salts of petroleum sulfonic acids, alkali metal salts of fatty acids, amine and ammonium soaps of fatty acids, alkali metal dialkyl sulfosuccinates, sulfated oils, sulfonated oils, alkali metal alkyl sulfates, and the like.

Cationic emulsifiers and nonionic emulsifiers and mixtures thereof are particularly effective dispersants/emulsifiers for the formulation of rolling oils. Cationic emulsifiers are generally employed at levels ranging from 0.1% to 4% and, more preferably, from 0.25% to 2% whereas nonionic emulsifiers typically are used at levels from 1% to 15% and, more preferably, from 2% to 10%.

A variety of additives can be included in the metalworking fluid to improve the quality of the fluid and/or enhance performance properties. These include but are not limited to EP additives, corrosion inhibitors, anti-wear agents, metal deactivators, defoamers, anti-rust agents, deodorants, dyes, fungicides, bacteriocides, antioxidants, emulsion or dispersion stabilizers and the like. These additives and their function in formulated lubricants are well known in the industry and widely reported in the literature.

Agents made by reacting several lubricating entities into one molecule out-perform the normal mixtures of the separate agents.

EXAMPLES

Example 1A

To a clean, dry 10 gallon stainless steel Pflaundler reactor was charged 12.7 kg of castor oil and 80 grams of potassium hydroxide, flake. Agitation was begun and the charge was heated to 120° C. under 720 mm Hg vacuum and held there for 15 minutes to remove, any water present. The vacuum was removed with nitrogen and after pressuring to 30 psi the reactor was vented to 5 psi. The temperature was increased to 135° C. and maintained there while 25.9 kg of ethylene oxide was added. The pressure was maintained below 60 psi. After all the ethylene oxide was added, the hydroxyl number was found to be 68.6 mg KOH per gram. At this point, 5.9 kg of the ethoxylate were removed under pressure and discarded. The temperature was then lowered to 120° C. and 8.4 kg of propylene oxide was added. After two hours at 120° C., the reaction mixture was vacuum stripped and 7.3 kg of product was discharged from the reactor. The product so produced contained about 43 moles of ethylene oxide per mole of castor oil and about 12 moles of propylene oxide per mole of castor oil.

Example 1B

Reaction of Castor Oil Alkoxylates with Maleic Anhydride

The castor oil alkoxylates and maleic anhydride are charged in a reactor at a 1:1 molar ratio. The reaction mixture is heated at 150° C. with agitation under a nitrogen sparge until GC analysis of the reaction mixture indicates no free maleic anhydride remains. This is a reaction between a hydroxyl group and an anhydride which results in an acid capped castor alkoxylate.

Example 2

Ene Reaction Between Soybean Oil and Maleic Anhydride

In the "ene" reaction, the maleic is grafted on the soybean oil. In this case the maleic anhydride is not opened. The maleic anhydride and soybean oil are charged into a reactor in a 1:1 molar ratio. The reaction mixture is up heated to 210° C. under a nitrogen sparge with agitation. The reaction mixture is held at 210° C. for 4-6 hours until GC analysis of the reaction mixture indicates no free maleic anhydride remains. The resulting soy/maleic anhydride adduct has a saponification value of 268 mg KOH/g.

Example 3

Reaction of Alkoxylated Trimethylol Propane (TMP) with the 1:1 Soy/Maleic Adduct The alkoxylated trimethylol propane and a 1:1 Soy/Maleic anhydride adduct were charged in a 1:1 mole ratio. The reaction mixture was up heated to 150° C. under a nitrogen sparge with agitation. The reaction mixture was held at this temperature until infrared analysis of the reaction mixture showed no anhydride absorbance band indicating complete reaction of the soy/maleic anhydride adduct. No catalyst is used.

Example 4

Reaction of HO—$(PO)_y$-$(EO)_x$—$(PO)_y$—OH (17-r-2) with Both Soy/Maleic Adduct and Polyricinoleic Acid Two reactions take place during this process. The first and fastest one is opening of the soy/maleic adduct to form an ester bond. No water is evolved. The other is the esterification of the polyricinoleic acid with the hydroxyl on the 17-r-2. This evolves water. This is run at 1 mole of 17-r-2 to 1 mole polyricinoleic and 1 mole soy/maleic anhydride adduct. Since the soy/maleic anhydride/17-r-2 reaction is much faster, a mixture of products will result, the soy/maleic/17-r-2 diester along with some of the polyricinoleic/17-r-2 diester. Since the soy/maleic adduct will react with most of the 17-r-2, there is probably free polyricinoleic acid as well.

The 1:1 Soy/maleic anhydride adduct, polyricinoleic acid and 17-r-2 were charged at a 1:1:1 mole ratio. 0.1 wt. % of hypophosphorous acid was added based on the total charge of reactants. The reaction mixture was slowly up heated to 180° C. under a nitrogen sparge with agitation. When the water of esterification stopped evolving, the reaction mixture was heated further to 200° C. until no more water evolved.

Examples of Lubricating Compositions

In each example, the chemical components were pre-blended and the mix reduced to 8% active in 300 ppm hardness water then tested on aluminum and cold-rolled steel in a Tapping Torque Instrument.

KEY TO ABBREVIATIONS

PROA=Polyricinoleic acid
PHSA=polyhydroxystedaric acid
DO-9=PEG 400 dioleate
CO-5=POE(5) castor oil
TMP=trimethylol propane [$CH_3$—$CH_2$—$C(CH_2OH)_3$]
MO=mineral oil (100 vis)-Hydrocal 100
W=Water
CP=cloud point
CI-pak (corrosion inhibitor)=premade corrosion inhibitor package comprised of:
A) Mixture of mono- and di-carboxylic acids of carbon chain lengths 9-12
B) Alkanolamines
C) Polyol coupling agents
Ethfac 140=unneutralized olyel alcohol with 4 moles EO and then phosphated
17-R-2=POP-PEO-POP reverse block copolymer.
AMP-95=2-amino-2-methyl-propanol
NDA=neodecanoic acid
ISO-C9=isononanoic acid
2976=POP(6)POE(34)(mixed)castor oil
Poly 30/70=polymer of 30% ricinoleic acid and 70% hydroxystearic acid
TEA=triethanolamine The Microtap tapping instrument used in the present invention is an industrial tapping machine that has been modified for lab evaluation of metal cutting lubricants on various metallurgies. The most common metals used are 1018 steel and 6061 aluminum alloys (ferrous and non-ferrous). The objective is to have lubricants that are effective for both ferrous and non-ferrous applications; this is fairly difficult since each category has unique requirements.

The Microtap unit uses standard high-speed-steel (HSS) taps to machine internal threads into pre-drilled holes. For this work a 6 mm form tap was used. During the tapping process the force or torque (Newton centimeters Ncm) is measued and recorded-lower values are desired. Tappong speeds are variable within a typical range of 500 to 1000 rpm.

The Microtap instrument is a relatively new (10 yrs) technology that replaced decades of Falex pin and V-block machine use to evaluate metalcutting lubricants. The pin and V-block is a friction-generating device that provided torque data but did not replicate metalcutting (chip formation) that occurs in actual filed applications.

Example 5

Example set (5) ERS 02157 [POP(40)POE(16) castor oil, AV=15] and ERS 02158 [POP(40)POE(16) castor oil, AV=25) were evaluated to investigate the effect of acid value.

The best from example set (5) are the synthetic mix of Ethox 17-R-2 and POP(40)POE(16)castor oil (AV=25) (ERS 02156), on cold-rolled steel and the semi-synthetic mixture of 100 SUS mineral oil and the POP(40)POE(16) castor oil (AV=20) (ERS 02159) on aluminum. See Table 1.

TABLE 1

| ID | Synthetic Lubricants Compostion of lubricant portion | Semi-Synthetic Lubricants Composition of lubricant portion | Activity In the test solution | Average torque in Newtons/cm Cold-rolled steel (1018 Cold Rolled Steel-, 560 RPM - 6X1 Forming Tap) | Average torque in Newtons/cm Aluminum (AL 6061 - 700 RPM - 6 X 1 Forming Tap) |
|---|---|---|---|---|---|
| ERS 02159 NB-1-60-E | (NA) | 14.00% POP(40)POE(16) castor oil, maleated (AV = 20) 16.00% Hydrocal 100 | 8% | 184.3 | 92.3 |
| ERS 02156 NB-1-57-DD | 7.6% POP(40)POE(16) castor oil, maleated (AV = 25) 3.8% 17-R-2 | (NA) | 8% | 151.3 | 148 |
| ERS 02157 NB-1-57-E | (NA) | 12.63% POP(40)POE(16) castor oil, maleated (AV = 15) 10.53% Hydrocal 100 | 8% | 169 | 100 |
| ERS 02158 NB-1-59-E | (NA) | 14.2% POP(40)POE(16) Castor oil, maleated (AV = 25) 9.24% Hydrocal 100 | 8% | 162.7 | 197.7 |

Compositions of non-lubricant portions of Set (5) formulations are outlined in Table 2.

TABLE 2

| Raw Material | ERS 02159 NB1-60-E | ERS 02156 NB1-57-DD | ERS 02157 NB1-57-E | ERS 02158 NB1-059-E |
|---|---|---|---|---|
| 2976 | 2.0% | X | X | X |
| AMP 95 | 3.0 | 2.8 | 3.16 | 2.9 |
| NDA | 3.0 | 2.8 | 3.16 | 2.9 |
| Water | 39.0 | 62.9 | 48.36 | 46.9 |
| CI pack | 16.0 | 15.2 | 16.84 | 18.2 |
| ISO C9 | 3.0 | 7.8 | 3.16 | 2.9 |
| PhSA | X | 1.9 | X | X |
| Poly 30/70 | X | X | 2.11 | 1.9 |
| 17-R-4 | X | X | X | 2.5 |
| Di soymaleate | | | | |

Example 6

Example set (6): Evaluated POP(25)POE(16) castor oil with a range of acid values and oil contents.

The best in set (6) is POP(25)POE(15)Castor oil reacted to AV=11.05 in combination with 100 SUS mineral oil. (ERS 02086). See Table 3

TABLE 3

| ID | Synthetic Lubricants Compostion of lubricant portion | Semi-Synthetic Lubricants Composition of lubricant portion | Activity In the test solution | Average torque in Newtons/cm Cold - rolled steel (1018 CRS - 560 RPM - 6X1 forming tap) | Average torque in Newtons/cm Aluminum (AL 6061 - 700 RPM - 6X1 Forming Tap) |
|---|---|---|---|---|---|
| ERS 02086 NB-1-040-C | (NA) | 14.0% POP(25)POE(16) castor oil, maleated, AV = 11.05 14.0% Hydrocal 100 | 8% | 174 | 97 |
| ERS 02088 NB-1-041-A | (NA) | 14% POP(25)POE(16) castor oil, maleated AV = 11.05 66% Hydrocal 100 | 8% | 264 | 113 |
| ERS 02084 NB-1-039-A | (NA) | 13.6% POP(25)POE(16) castor oil, maleated AV = 27 13.5% Hydrocal 100 | 8% | 176 | 124 |
| ERS 02085 NB-1-039-C | (NA) | 14.0% POP(25)POE(16) castor oil, maleated AV = 27 4.0% Hydrocal 100 | 8% | 180 | 128 |
| ERS 02089 NB-1-041-B | (NA) | 14% POP(25)POE(16) castor oil, maleated AV = 27 64% Hydrocal 100 | 8% | 256 | 130 |

TABLE 3-continued

| ID | Synthetic Lubricants Compostion of lubricant portion | Semi-Synthetic Lubricants Composition of lubricant portion | Activity In the test solution | Average torque in Newtons/cm Cold - rolled steel (1018 CRS - 560 RPM - 6X1 forming tap) | Average torque in Newtons/cm Aluminum (AL 6061 - 700 RPM - 6X1 Forming Tap) |
|---|---|---|---|---|---|
| ERS 02087 NB-1-040-D | (NA) | 14.0% POP(25)POE(16) castor oil maleated AV = 11.05 4.0% Hydrocal 100 | 8% | 161 | 155 |

Compositions of non-lubricant portions of Set (6) formulations are outlined in Table 4.

TABLE 4

| Raw Material | ERS 02086 NB1-040-C | ERS 02088 NB1-041-A | ERS 02084 NB1-039-A | ERS 02085 NB1-039-C | ERS 02089 NB1-041-B | ERS-02087 NB1-040-D |
|---|---|---|---|---|---|---|
| DO-9 | 4.0% | 12% | 3.9% | 3.0% | 13% | 3.0% |
| AMP 95 | 3.0 | X | 2.9 | 3.0 | X | 3.0 |
| NDA | X | X | 2.9 | X | X | X |
| Water | 46.0 | X | 44.7 | 58.0 | X | X |
| PhSA | 3.0 | 3 | 2.9 | 2.0 | 3 | 58.0 |
| TEA | X | 5 | X | X | 6 | X |
| CI pak | 16.0 | 0 | 15.5 | 16.0 | X | 16.0 |

Example 7

Example set (7): Best in set 7 is Ethox 17-R-2 reacted 1:1 with polyricinoleic acid, AV=15.6, and blended with 100 SUS mineral oil. (ERS 02115). See Table 5

TABLE 5

| ID | Synthetic Lubricants Compostion of lubricant portion | Semi-Synthetic Lubricants Composition of lubricant portion | Activity In the test solution | Average torque in Newtons/cm Cold - rolled steel (1018 CRS - 560 RPM - 6X1 forming tap) | Average torque in Newtons/cm Aluminum (AL 6061 - 700 RPM - 6 X 1 Forming Tap |
|---|---|---|---|---|---|
| ERS 02115 NB-1-047-F | (NA) | 14.41% 17-R-2(1:1) Polyricinolate AV = 15.6 21.62% Hydrocal 100 | 8% |  | 83 |
| ERS 02086/ NB-1-040-C | (NA) | 14.0% POP(25)POE(15) castor oil, maleated, AV = 11.05 14.0% Hydrocal 100 | 8% | 174 | 97 |
| ERS 02111/ NB-1-046-A | (NA) | 14.3% POP(25)POE(15) castor oil, maleated, (AV = 9) 10.2% Hydrocal 100 | 8% |  | 100 |
| ERS 02112/ NB-1-046-B | (NA) | 14.89% POP(30)POE(10) TMP soy maleate 10.64% Hydrocal 100 | 8% |  | 101 |
| ERS 02114/ NB-1-047-D | (NA) | 13.86% POP(25)POE(15) castor oil, maleated, AV = 19 9.90% Hydrocal 100 | 8% |  | 101.5 |
| ERS 02113/ NB-1-047-B | (NA) | 13.86% POP(25)POE(15) castor oil maleated AV = 19 3.96% Ethox 17-R-2/ 9.90% Hydrocal 100 | 8% |  | 109 |

Compositions of non-lubricant portions of Set (7) formulations are outline in Table 6.

TABLE 6

| Raw Material | ERS 02115 NB1-047-F | ERS 02086 NB1-040-C | ERS 02111 NB1-46-A | ERS 02112 NB1-046-B | ERS 02114 NB1-047-D | ERS 02113 NB1-047-B |
|---|---|---|---|---|---|---|
| DO-9 | 3.60% | 4.0 | X | X | X | X |
| CO-5 | X | X | 4.08 | X | 3.96 | 3.96 |
| 17-R-2 | X | X | X | X | X | X |
| AMP 95 | 2.70% | 3.0 | 3.06 | 3.06 | 2.97 | 2.97 |
| NDA | 2.70% | X | 3.06 | 3.06 | 1.98 | 2.0 |
| Water | 36.06% | 46.0 | 42.9 | 42.9 | 46.55 | 46.0 |
| CI pack | 14.41% | 16.0 | 16.3 | 16.3 | 15.84 | 15.81 |
| ISO C9 | 2.7 | X | 3.06 | 3.06 | 1.98 | 2.0 |
| PEG 200 | 1.80% | X | X | X | X | X |
| PhSA | X | 3.0 | 3.06 | 3.06 | 1.98 | 1.98 |
| Ethfac 140 | X | X | X | X | 0.99 | X |

Example 8

Example set 8: Best in set (8) is a blend of 100 SUS VIS 20 mineral oil and Ethox 17-R-2:polyricinoleic:soy maleate in a 1:1:1 mole ratio. (ERS 02132). See Table 7.

TABLE 7

| ID | Synthetic Lubricants Compostion of lubricant portion | Semi-Synthetic Lubricants Composition of lubricant portion | Activity In the test solution | Average torque in Newtons/cm Cold - rolled steel (1018 CRS - 560 RPM - 6X1 forming tap) | Average torque in Newtons/cm Aluminum (AL 6061 - 700 RPM - 6 X 1 Forming Tap |
|---|---|---|---|---|---|
| ERS 02133/ NB-1-52-E | (NA) | 12.12% 1:1:1 mole 17-R-2:Polyricinoleic Acid:Soy maleate 14.14% Hydrocal 100 | 8% | 174.1 | 94 |
| ERS 02131/ NB-1-52-C | (NA) | 13.73% POP(25)POE(15) castor oil, maleated, AV = 15.2 13.73% Hydrocal 100 | 8% | 173.3 | 94.3 |
| ERS 02132/ NB-1-52-B | (NA) | 12.00% 17-R-2 Polyricinolate (1:1) AV = 15.6 16% Hydrocal 100 | 8% | 181.3 | 96 |

Compositions of non-lubricant portions of Set (8) formulations are outlined in Table 8.

TABLE 8

| Raw Material | ERS 02133 NB1-52-E | ERS 02131 NB1-52-C | ERS 02132 NB1-52-B |
|---|---|---|---|
| 2976 | 3.03 | 0 | 3 |
| AMP 95 | 3.03 | 2 | 2 |
| NDA | 3.03 | 3 | 3 |
| Water | 42.43 | 40 | 40 |
| CI pack | 16.16 | 16 | 16 |
| ISO C9 | 3.03 | 3 | 3 |
| PEG 200 | X | 1 | 1 |
| PROA | 3.03 | 4 | 4 |

Example 9

Example set 9: Evaluations of commercially successful products. See Table 9.

| COMMERCIAL COMPETITORS TRADE NAME | Synthetic | Semi-Synthetic | Activity In the test solution | Average torque in Newtons/cm Cold - rolled steel (1018 CRS - 560 RPM - 6X1 forming tap) | Average torque in Newtons/cm Aluminum (AL 6061 - 700 RPM - 6 X 1 Forming Tap |
|---|---|---|---|---|---|
| Castrol AU-68 | yes | | 10% | 162.3 | 107.1 |
| Syn 3495 | yes | | 10% | | 108 |
| Syn 2495 | yes | | 10% | 232.9 | 135 |
| HO Cut 795 H | | yes | 10% | | 146 |

| COMMERCIAL COMPETITORS TRADE NAME | Synthetic | Semi-Synthetic | Activity In the test solution | Average torque in Newtons/cm Cold - rolled steel (1018 CRS - 560 RPM - 6X1 forming tap) | Average torque in Newtons/cm Aluminum (AL 6061 - 700 RPM - 6 X 1 Forming Tap) |
|---|---|---|---|---|---|
| HOSS 5200 II | | yes | 10% | | 159 |
| HOSS 5100 II | yes | | 10% | | 180 |
| LT 5200 | | yes | 10% | | 198 |

Example 10

Further Microtap Measurements

1018 Steel:
2% additive 4718 (Formula I of the invention) in 100 ppm water
  500 rpm=181 Ncm 750 rpm=181 Ncm
2% 02332 additive in 100 ppm water
  500 rpm=154 Ncm 750 rpm=177 Ncm
6061 Aluminum:
2% additive 4718 (Formula I of the invention) in 100 ppm water
  1,000 rpm=118 Ncm
2% additive 02332
  1,000 rpm=118 Ncm The content of all references cited in the instant specification and all cited references in each of those references are incorporated in their entirety by reference herein as if those references were fully denoted in the text.

While the many embodiments of the invention have been disclosed above and include presently preferred embodiments, many other embodiments and variations are possible within the scope of the present disclosure and in the appended claims that follow. Accordingly, the details of the preferred embodiments and examples provided are not to be construed as limiting. It is to be understood that the terms used herein are merely descriptive rather than limiting and that various changes, numerous equivalents may be made without departing from the spirit or scope of the claimed invention.

What is claimed is:

1. A compound of the formula II

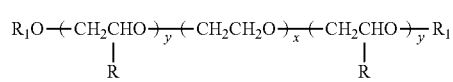

wherein R is methyl, $R_1$ is polyricinoleyl, x=10-100 and y=10-200.

2. A compound which is
the reaction product of maleated soybean oil with the reaction product of a polyalkanoic or polyalkenoic acid derived from hydroxyfatty acids and a block copolymer selected from the group consisting of polyoxyethylene-polyoxypropylene and a reverse block copolymer of polyoxypropylene-polyoxyethylene-polyoxypropylene.

3. A lubricating composition comprising:
(1) a reaction product of:
  maleated soybean oil with a polyalkanoic or polyalkenoic acid derived from hydroxyfatty acids and a block copolymer selected from the group consisting of polyoxyethylene-polyoxypropylene and a reverse block copolymer of polyoxypropylene-polyoxyethylene-polyoxypropylene; and
(2) at least one base oil selected from the group consisting of alkyl benzene, normal paraffin, isoparaffin, mineral oil and α-olefin.

4. A compound which is the reaction product of a first material defined as the reaction product of a polyalkanoic or polyalkenoic acid derived from hydroxyfatty acids and a block copolymer selected from the group consisting of polyoxyethylene-polyoxypropylene and a reverse block copolymer of polyoxypropylene-polyoxyethylene-polyoxypropylene; with
maleated soybean oil or maleated castor oil wherein said compound has a formula I:

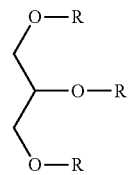

where R is

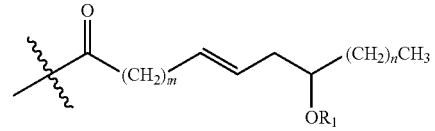

where m=3-12, n=3-8 and $R_1$ is

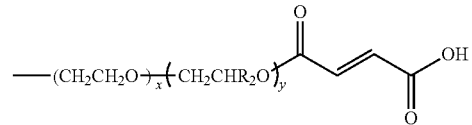

where x=1-50, y=1-100 and $R_2$ is $C_1$-$C_{16}$ primary alkyl or secondary alkyl.

5. A compound which is the reaction product of a first material defined as the reaction product of a polyalkanoic or polyalkenoic acid derived from hydroxyfatty acids and a block copolymer selected from the group consisting of polyoxyethylene-polyoxypropylene and a reverse block copolymer of polyoxypropylene-polyoxyethylene-polyoxypropylene;

with maleated soybean oil or maleated castor oil, wherein said compound has the formula II:

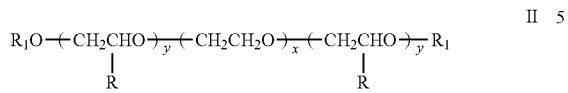

II where R is $C_1$-$C_{16}$ primary alkyl or secondary alkyl; $R_1$ is selected from the group consisting of a maleated soybean oil moiety, polyhydroxystearyl, polyricinoleyl and mixtures thereof and at least one $R_1$ is selected from the group consisting of maleated soybean oil moiety and polyricinoleyl; x=1-100 and y=1-200.

* * * * *